Aug. 6, 1974  D. DOUGLAS  3,827,925
METHOD OF JOINING THE WALLS OF A DOUBLE-WALLED VESSEL
Filed Oct. 6, 1972
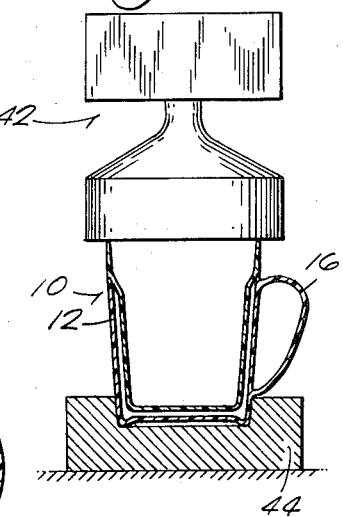
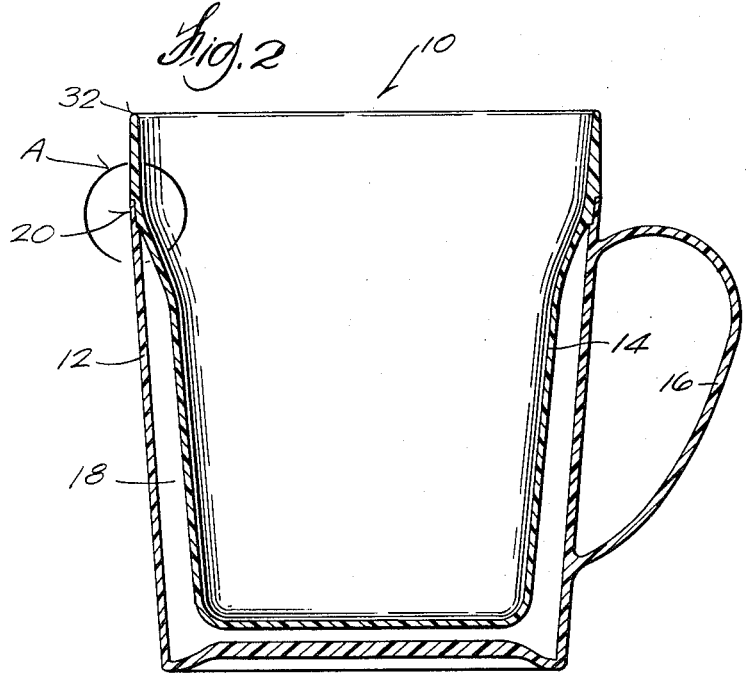
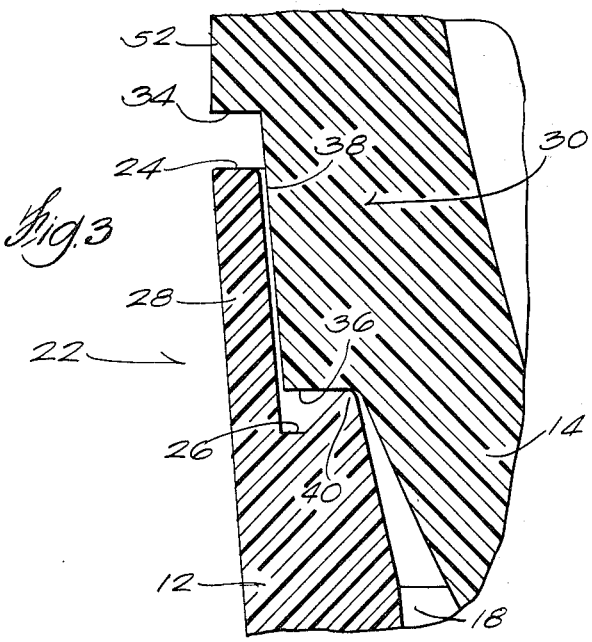
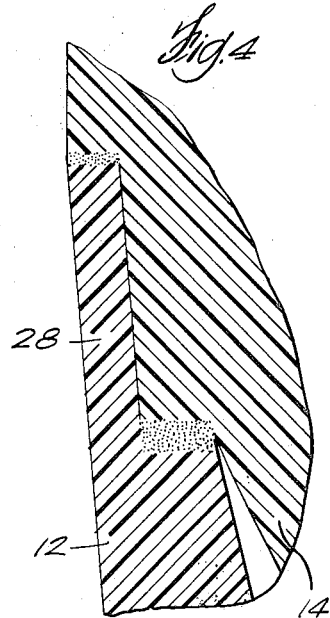

United States Patent Office 3,827,925
Patented Aug. 6, 1974

3,827,925
METHOD OF JOINING THE WALLS OF A
DOUBLE-WALLED VESSEL
David Douglas, 1119 Lincoln Blvd.,
Manitowoc, Wis. 54220
Filed Oct. 6, 1972, Ser. No. 295,602
Int. Cl. B32b 31/20
U.S. Cl. 156—73                                    5 Claims

ABSTRACT OF THE DISCLOSURE

A sealed joint between otherwise spaced apart inner liner and outer jacket of a double-walled, i.e. insulated, vessel is formed by sonic welding. One wall, the liner or the jacket, is provided with a shoulder defining two relatively spaced but commonly facing surfaces which, in assembly, are positioned in opposed relationship with a similar shoulder and similarly arranged surfaces on the other wall. A projection on one shoulder engages an opposed surface and functions to hold the opposed surfaces of the two walls apart initially. The liner and jacket are subjected to sonic vibrations and the projection directs the energy of the sonic vibrations to the area of limited engagement between it and the surface it engages. The projection and surface contacted thereby liquify and fuse. As liquification and fusion progresses the opposed surfaces are moved together with the sonic vibrations being continued until after the surfaces of one wall shoulder engage and fuse with those of the other to thereby seal the space between the liner and jacket with two concentric welds.

BACKGROUND OF THE INVENTION

This invention relates to insulated vessels and, more particularly, to a method of joining the inner liner and outer jacket of such vessels.

Generally an insulated liquid container, e.g. a drinking cup or beverage server, has a liner and jacket joined together in a manner to provide a sealed, separating space therebetween. There have been various proposals for achieving the joint between the liner and jacket and this invention is concerned with that problem.

SUMMARY OF INVENTION

Among the general objects of this invention is to provide an effective sealed joint between the inner and outer walls of a double-walled vessel, and to do so in an economical manner and without affecting the appearance of the vessel.

For the achievement of this and other objects, this invention proposes an arrangement wherein the inner and outer walls of a double-walled vessel, which are generally spaced apart to provide an insulating space therebetween, are brought together with surface thereof in opposed relationship, and held apart, initially, by a projection on a surface of one wall making limited engagement with an opposed surface of the other wall. The inner and outer walls are subjected to sonic vibrations and the projection directs the energy so created to the area of limited engagement at which area liquification and fusion of the projection and the contacted surface occurs. The walls are moved together as said liquification and fusion is occurring with application of the sonic vibration being continued until the opposed surfaces are fully engaged and completely fused to seal the space between the walls.

Preferably, a pair of commonly facing, but spaced apart, annular surfaces are provided on each wall and each pair is in opposed relation with similar surfaces on the other wall in assembly, the projection maintaining initial spacing therebetween. The opposed surfaces are relatively spaced radially, i.e. relative to the cup axis, and the projection and its opposed surface are the radially innermost.

DESCRIPTION OF DRAWINGS

FIG. 1 is a side elevation of the vessel in section and also illustrating, schematically, apparatus for sonic welding;

FIG. 2 is an enlarged view of the vessel in section;

FIG. 3 is an enlarged view of area "A" in FIG. 1 prior to the weld; and

FIG. 4 is an enlarged view of area "A" after the weld.

DESCRIPTION OF PREFERRED EMBODIMENT

With particular reference to the drawing, a drinking cup 10 is shown consisting of an outer jacket, wall 12, an inner liner, wall 14, and a handle 16. The liner telescopes into the jacket and the inner and outer walls are spaced apart to define an insulating space 18 therebetween.

The cup is made up of the two parts, the liner and the jacket which also carries handle 16. These parts are joined along a seam 20 in a manner to seal space 18. The cup parts are made from a suitable plastic material having thermoplastic properties and the joint is formed by sonic welding.

The cup parts are provided with a particular configuration at the joint which is effective in facilitating the weld joint and achieving a seal in that area.

With reference to FIG. 3, outer wall 12 has a shoulder 22 at its upper end. The shoulder provides two surfaces 24 and 26 which are relatively spaced apart by extension 28 and face in a common direction in the drawing upward. Inner wall 14 also has a shoulder 30 which is similar to shoulder 22 but is spaced from the end 32 of the inner wall. Shoulder 30 also defines two surfaces 34 and 36 which are relatively spaced apart by extension 38 and face in a common direction, but in this instance downward. With respect to the axis of the cup, surfaces 24, 26, and 34, 36 are spaced radially relative to each other and face in an axial direction and are generally circular.

In the assembly process the liner and the jacket are brought together so that the liner telescopes into the jacket and shoulders 22 and 30 are adjacent with surface 24 opposed to surface 34 and surface 26 opposed to surface 36, but with those surfaces initially spaced apart.

A projection 40 is provided on surface 26 and serves a two-fold function. It engages surface 36 to initially hold surfaces 24 and 26 spaced from surfaces 34 and 36 and also functions to direct the energy created during sonic welding. The shoulder configurations, the surfaces formed thereby, and projection 40 extend completely around the cup. Thus, there is a continuous annular projection 40 on surface 26 which, because of its general triangular cross-section, makes limited engagement with surface 36. This provides initial line contact between projection 40 and surface 36 thereby promoting initial liquification and fusion of the projection and the surface it engages.

The sonic welding apparatus used to achieve the weld joint is a conventional piece of equipment and hence is only schematically illustrated in FIG. 1. A general description of the operation of the welding apparatus should be sufficient for an understanding of this invention. Cup 10 is positioned between horn assembly 42 and support base 44, being engaged by both the horn and the support base. Sonic vibrations generated in horn assembly 42 are applied directly to cup parts 12 and 14. Since the only point of contact between the cup parts is projection 40 with surface 36, the limited area of engagement thereby produced results in an extremely high energy concentration and a liquification of the plastic material of both the projection and surface 36 results. Once initiated, liquification progresses continuously as the application of the sonic vibrations is maintained. During this period, i.e. after initial liquification and as sonic vibration is maintained, horn assembly 42 is moved toward base support 44 in accordance with the amount of liquification taking place. Again, this movement is produced by conventional means, springs, hydraulic or pneumatic cylinders, etc.

The original spacing between surfaces 24 and 34 is greater than that between surfaces 26 and 36 so that the later will be fully engaged before the former. The application of sonic vibrations, and the movement of cup parts toward each other, is continued until surfaces 24 and 34 are in engagement and fusion has occurred therebetween. At that time, the sonic vibrations are stopped and the fused joints permitted to set.

The arrangement described provides a dual joint made up of two concentric welds which insures a seal. That is, the outer joint between surfaces 24 and 34 backs up the inner joint between surfaces 26 and 36, and vice versa, to insure that space 18 is sealed. There is decided advantage to providing the projection between the radially inner set of surfaces. This is the area in which extensive fusion takes place and, being positioned internally, it does not interfere with the appearance of the cup. Also, any dripping of melted plastic will be into space 18 making for a clean welding operation and again not interfering with cup appearance.

During the welding operation there will be some circumferential contraction of part 12 in the area of shoulder 22. To accommodate this, the outer circumference of part 14 in the area 52 above shoulder 30 is less than that of part 14 in the area of shoulder 22. More specifically, this contraction will be approximately .005 inch in the diameter in a cup having an open end diameter of approximately 3.150 inches. The initial diameter of part 14 in area 52 is selected to be approximately .005 inch less than the diameter of part 14 in the area of shoulder 22 where the final joint will occur. Therefore, the parts 12 and 14 will be flush at that joint after the parts have set.

Also, during welding heat is generated causing the air in space 18 to expand. After the joint sets, the air will contract in space 18 thereby creating at least a partial vacuum for better insulation.

Although but one embodiment of the present invention has been illustrated and described, it will be apparent to those skilled in the art that various changes and modifications may be made therein without departing from the spirit of the invention or from the scope of the appended claims.

I claim:
1. In the method of fabricating a double-walled vessel, sonic welding a joint between first and second vessel walls and comprising the steps of
providing first and second surfaces on each of said vessel walls which surfaces on each vessel wall are relatively spaced but face in a generally common direction and one of said surfaces having a projection thereon whereby two sets of facing surfaces are provided,
bringing said vessel walls together in overlapping relation with the first and second surfaces on one facing the first and second surfaces on the other, said projection abutting one of said surfaces to hold said facing surfaces apart and so that said projection initially engages a limited portion of said one of said surfaces, and the remainder of said overlapping inner and outer walls being spaced apart to provide a space therebetween,
subjecting said vessel walls to sonic vibrations causing said projection and the surface with which it is engaged to liquify and fuse,
as said sonic vibrations are being applied and said fusion is occurring, providing relative movement of said vessel walls in a direction whereby said facing surfaces move toward engagement,
and continuing said sonic vibrations until said facing surfaces are in engagement and a fusion of said facing surfaces has occurred to seal said space.

2. The method of claim 1
wherein one set of said facing surfaces is located radially inward of the other set and said two sets are separated by an axially extending rim located on the outer surface of said vessel causing the formation of radially inner and outer weld joints between said inner and outer walls,
and including the step of spacing said radially outer set of surfaces initially further apart than said radially inner set of surfaces causing complete engagement of said inner set of surfaces before said outer set engage and fusion therebetween begins.

3. The method of claim 2 wherein said projection is between the inner set of surfaces causing any dripping material to fall into said space.

4. In the method of fabricating a double-walled vessel, sonic welding a joint between an inner liner and an outer jacket both of which are cup shaped and comprising the steps of
providing a generally annular surface on each of said liner and jacket and an annular projection on one of said surfaces,
bringing said liner and jacket together with one inside the other and said surfaces facing each other, said projection engaging a limited portion of the facing surface and holding said surfaces apart, and with a space between the remainder of said liner and jacket,
subjecting said vessel walls to sonic vibrations causing said projection and the surface with which it is engaged to liquify and fuse,
as said sonic vibrations are being applied and said fusion is occurring, providing relative movement of said liner and jacket in a direction whereby said facing surfaces move toward engagement,
and continuing said sonic vibrations until said facing surfaces are in engagement and a fusion of said facing surfaces has occurred to seal said space.

5. The method of claim 4 including
providing a second set of generally annular facing surfaces, one surface on said liner and one surface on said jacket,
spacing said sets of facing surfaces radially and axially relative to the axis of said vessel,
and causing a fusion of both sets of surfaces.

References Cited
UNITED STATES PATENTS

| | | | |
|---|---|---|---|
| 3,120,570 | 2/1964 | Kennedy et al. | 156—75 X |
| 3,562,078 | 2/1971 | Zumstein | 156—74 X |

EDWARD G. WHITBY, Primary Examiner

U.S. Cl. X.R.

215—12 R; 220—9 R